US011512366B2

United States Patent
Borkowski et al.

(10) Patent No.: US 11,512,366 B2
(45) Date of Patent: Nov. 29, 2022

(54) VACUUM ARC REMELTING PROCESSING

(71) Applicant: United Technologies Corporation, Farmington, CT (US)

(72) Inventors: Luke Borkowski, West Hartford, CT (US); Alexander Staroselsky, Avon, CT (US)

(73) Assignee: Raytheon Technologies Corporation, Farmington, CT (US)

(*) Notice: Subject to any disclaimer, the term of this patent is extended or adjusted under 35 U.S.C. 154(b) by 462 days.

(21) Appl. No.: 16/590,763

(22) Filed: Oct. 2, 2019

(65) Prior Publication Data
US 2021/0102272 A1    Apr. 8, 2021

(51) Int. Cl.
*C22B 9/20* (2006.01)
*C22B 9/02* (2006.01)
*C22B 9/04* (2006.01)

(52) U.S. Cl.
CPC .............. *C22B 9/20* (2013.01); *C22B 9/026* (2013.01); *C22B 9/04* (2013.01)

(58) Field of Classification Search
CPC .............. C22B 9/20; C22B 9/26; C22B 9/04
See application file for complete search history.

(56) References Cited

U.S. PATENT DOCUMENTS

| 3,193,889 A * | 7/1965 | McDonald ............. B22D 7/005 164/48 |
| 6,295,309 B1 | 9/2001 | Benz et al. |
| 2014/0255620 A1 | 9/2014 | Shuck et al. |
| 2021/0102272 A1* | 4/2021 | Borkowski ............. F27D 19/00 |

FOREIGN PATENT DOCUMENTS

| CA | 740057 A | 8/1966 |
| CN | 106756137 B | 6/2018 |
| EP | 1184470 A2 | 3/2002 |
| JP | 2013066920 A | 4/2013 |
| KR | 20046985 Y1 | 6/2012 |

OTHER PUBLICATIONS

EP Search Report dated Dec. 1, 2020 issued for corresponding European Patent Application No. 20199897.8.

* cited by examiner

*Primary Examiner* — Scott R Kastler
(74) *Attorney, Agent, or Firm* — Bachman & LaPointe, P.C.

(57) ABSTRACT

A vacuum arc remelt apparatus comprising a crucible having a wall, said wall having an interior and an exterior opposite said interior; an electrode within the crucible proximate the interior; an ingot within the crucible and below the electrode, wherein said ingot includes a crown and shelf; and a vibration source at the exterior of the crucible proximate the crown and shelf.

14 Claims, 3 Drawing Sheets

VACUUM ARC REMELTING PROCESSING

BACKGROUND

The present disclosure is directed to the improved vacuum arc remelting processing, and more particularly use of ultrasonic vibration for reduction and/or elimination of dirty white spot defects.

Inconel 718 (IN718), a nickel-based superalloy, is commonly used for the production of parts exposed to harsh service conditions such as high temperatures. For aerospace engines, IN718 is used for disks, blades, seals, and combustors. In the airframe industry, IN718 is used for high speed parts such as wheels, buckets, and spacers. IN718 is also used in the land based gas turbine industry.

Wrought IN718 parts are produced through forging billet mults using either a triple-melt procedure comprising vacuum induction melting (VIM), electro-slag remelting (ESR), and vacuum arc remelting (VAR), or a double melt procedure (VIM+VAR or VIM+ESR), followed by further thermomechanical processing and forming steps.

The VAR process, while very energy, time, and cost intensive, has been designed to achieve clean, defect-free material. One defect that has been gaining recent attention is called dirty white spots (DWSs). DWSs are often difficult or even impossible to detect in forged parts processed using VAR. As such, they can lead to devastating (>30× reduction) effects on fatigue life.

FAA has recommended triple melt for all engine concept designs. While triple melt has been proven to reduce the frequency of DWSs, there are recent examples of these dangerous defects existing in forged parts. As a result, engine OEMs assume worst-case low cycle fatigue when designing IN718 parts which, in turn, causes parts to be overdesigned leading to even greater energy consumption, longer lead time, and higher cost.

Referring to FIG. 1 an alloy that will undergo VAR is formed into a cylinder typically by vacuum induction melting (VIM) or ladle refining (airmelt). This cylinder, referred to as an electrode is then put into a large cylindrical enclosed crucible and brought to a metallurgical vacuum (0.001-0.1 mmHg or 0.1-13.3 Pa). At the bottom of the crucible is a small amount of the alloy to be remelted, which the top electrode is brought close to prior to starting the melt. Several kiloamperes of DC current are used to start an arc between the two pieces, and from there, a continuous melt is derived. The crucible (typically made of copper) is surrounded by a water jacket used to cool the melt and control the solidification rate. To prevent arcing between the electrode and the crucible side walls, the diameter of the crucible is larger than that of the electrode. As a result, the electrode must be lowered as the melt consumes it. Control of the current, cooling water, and electrode gap is required for the effective control of the process, and production of defect free material.

However, as seen in FIG. 2, DWSs form during the VAR process due to the crown and shelf denoted in FIG. 2, breaking off and falling into the melt pool. These oxide-containing fall-in particles partially remelt before settling in the mushy zone where they are engulfed by the solidification front. DWSs have a different microstructure and contain stringers of oxide particles which contribute to the substantial fatigue life reduction.

SUMMARY

In accordance with the present disclosure, there is provided a vacuum arc remelt apparatus comprising a crucible having a wall, the wall having an interior and an exterior opposite the interior; an electrode within the crucible proximate the interior; an ingot within the crucible and below the electrode, wherein the ingot includes a crown and a shelf; and a vibration source at the exterior of the crucible proximate the crown and shelf.

In another and alternative embodiment, the vibration source comprises at least one of an ultrasonic transducer and a vibrator.

In another and alternative embodiment, the vibrator comprises a mechanical vibrator.

In another and alternative embodiment, the ultrasonic transducer is configured to break up the materials of the crown and the shelf during the operation of the vacuum arc remelt apparatus responsive to a predetermined size of the crown and the shelf.

In another and alternative embodiment, the apparatus further comprises a microscale model coupled to the vibration source.

In another and alternative embodiment, the vibration source controls nucleation and growth mechanics of formation of the crown and the shelf.

In accordance with the present disclosure, there is provided a vacuum arc remelt apparatus comprising a crucible having a side wall, the side wall having an interior and an exterior opposite the interior, a bottom plate coupled to the side wall; an electrode coupled to a stinger, the stinger coupled to a ram configured to translate the electrode within the crucible; an ingot between the electrode and the bottom plate between the side wall proximate the interior, wherein the ingot forms a melt pool and a crown and a shelf responsive to an electrical arc with the electrode; and a vibration source coupled to the exterior and configured to control the nucleation and growth mechanics of formation of the crown and the shelf.

In another and alternative embodiment, the vibration source comprises an ultrasonic transducer.

In another and alternative embodiment, the ultrasonic transducer is configured to excite portions of the melt pool and lead to the reduction of grain sizes in the ingot.

In another and alternative embodiment, the ultrasonic transducer is focused to ultrasonically load the crown and the shelf.

In another and alternative embodiment, the vibration source comprises multiple vibration sources configured along the crucible to control the crown and the shelf formation.

In another and alternative embodiment, the vibration source comprises a vibrator.

In accordance with the present disclosure, there is provided a process for vacuum arc remelting comprising inserting an ingot between an electrode and a bottom of a crucible of the vacuum arc remelt apparatus, the crucible comprising a wall having an interior and an exterior, the wall being adjacent the bottom; melting the electrode with an arc between the electrode and the ingot; forming a melt pool on top of the ingot proximate the electrode; and vibrating a crown and a shelf proximate the melt pool with a vibration source coupled to the crucible proximate the exterior.

In another and alternative embodiment, the vibration source comprises at least one of an ultrasonic transducer and a vibrator.

In another and alternative embodiment, the process further comprises exciting portions of the melt pool with the vibration source to reduce grain sizes in the ingot.

In another and alternative embodiment, the process further comprises breaking up the materials of the crown and the shelf during the operation of the vacuum arc remelt apparatus with the vibration source.

In another and alternative embodiment, the process further comprises focusing the vibration source to ultrasonically load the crown and the shelf.

In another and alternative embodiment, the process further comprises employing a microscale model; and determining an ultrasonic frequencies for solidification of the melt pool in the absence of dirty white spots.

The exemplary vacuum arc remelt process employs ultrasonic waves to break up the crown and the shelf during the VAR process to ensure complete remelt of the particles falling into the melt pool.

Other details of the VAR process are set forth in the following detailed description and the accompanying drawings wherein like reference numerals depict like elements. Any of the above described embodiments can be combined to improve the technical effect of the VAR process.

DETAILED DESCRIPTION

Figure 1:
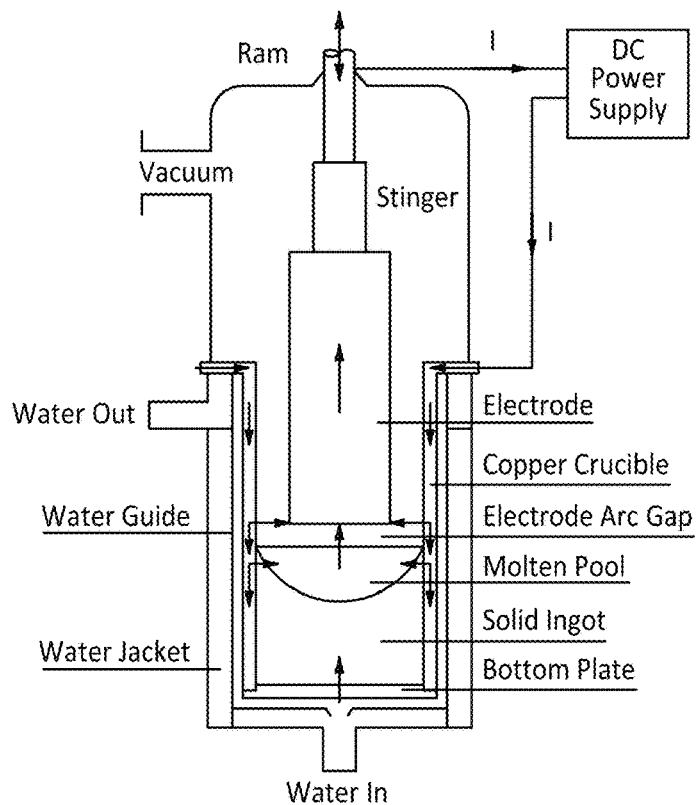
FIG. 1 is a prior art schematic diagram of an exemplary vacuum arc remelt apparatus.
Figure 2:
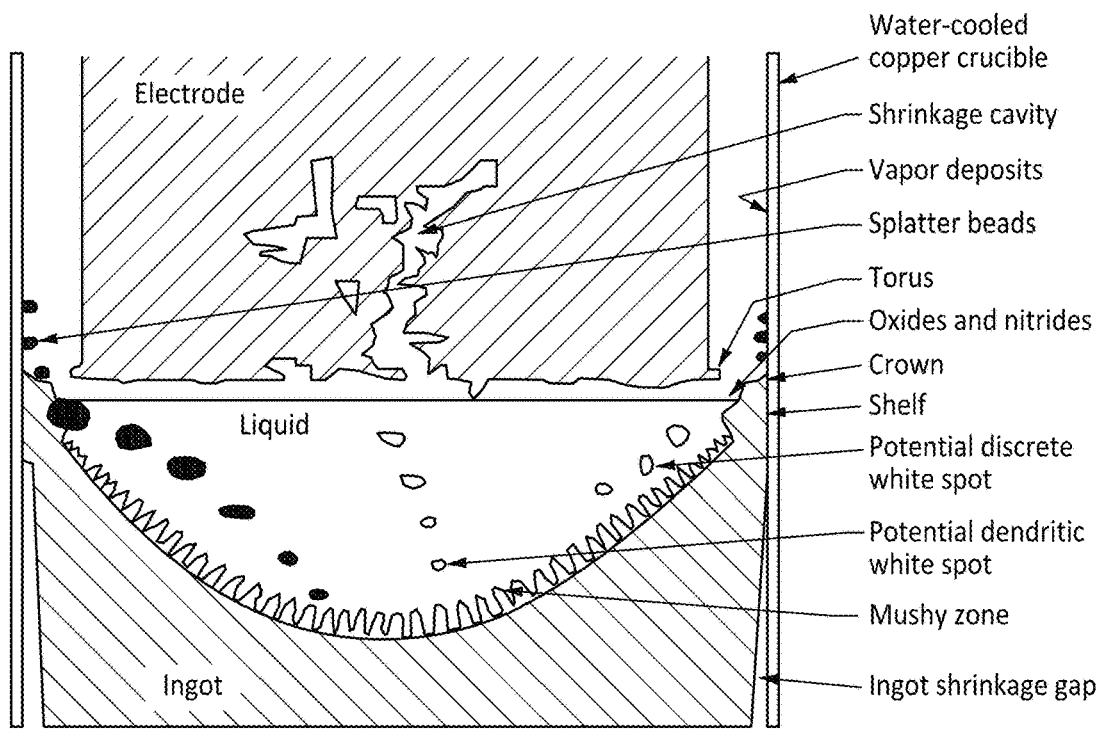
FIG. 2 is a prior art schematic diagram of an exemplary vacuum arc remelt process with formation of dirty white spots.
Figure 3:
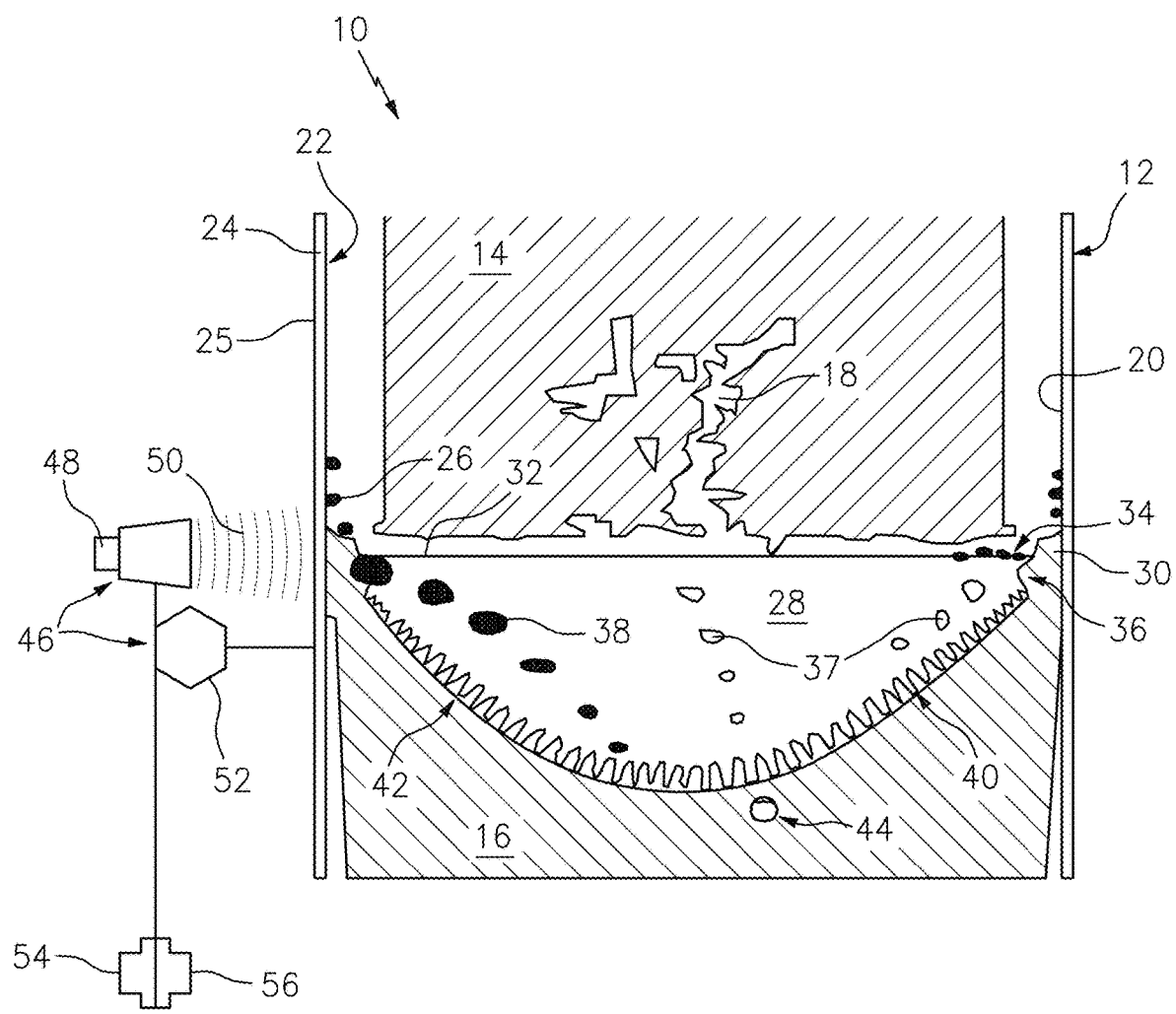
FIG. 3 is a schematic diagram of an exemplary vacuum arc remelt process with enhancement.
Figure 4:
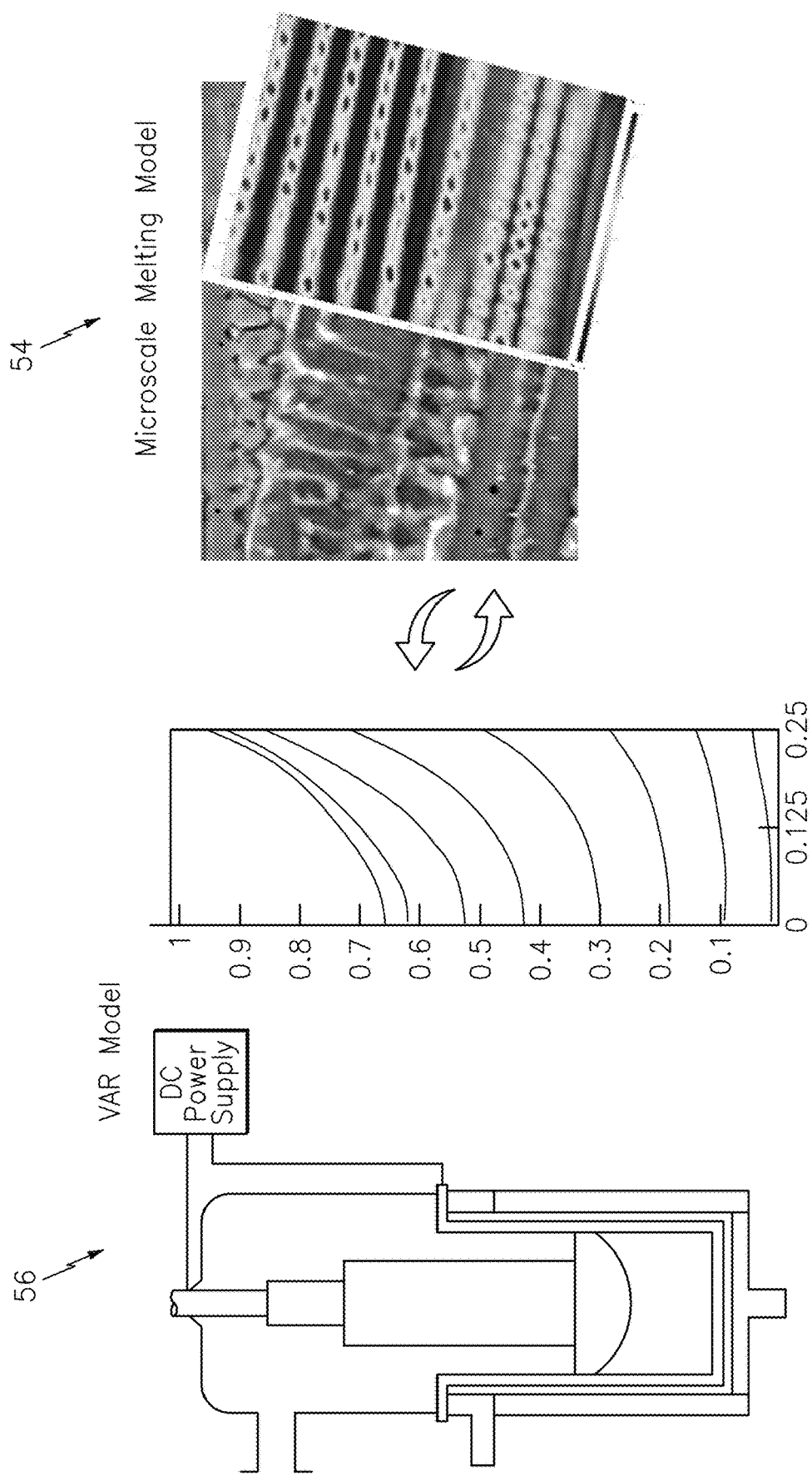
FIG. 4 is a schematic diagram of exemplary vacuum arc remelt models.

Referring now to FIG. 3. a schematic diagram of an exemplary vacuum arc remelt apparatus with enhancement is shown. The lower portion of the vacuum arc remelt apparatus 10 is shown in FIG. 3. A copper crucible 12 is utilized. The copper crucible 12 is water cooled. The electrode 14 is shown within the crucible 12 being lowered toward the ingot 16. The electrode 14 includes a shrinkage cavity 18. The ingot 16 is located opposite the electrode 14 in the crucible 12. Vapor deposits 20 are shown along the interior 22 of the wall 24 of the crucible 12. Splatter beads 26 can deposit on the interior 22 of the wall 24.

As the electrode 14 is melted, a melt pool 28, liquid ingot material, is formed between the electrode 14 and portions of the ingot 16 that has solidified. The ingot 16 includes a crown 30 and a shelf 36 formed proximate the wall 24 and near the melt pool 28 top surface 32. The crown 30 and shelf 36 can be formed by the accumulation of the splatter beads 26, vapor deposits 20 and elevated cooling rate near the interior of the crucible wall 22. The crown 30 and shelf 36 include particles containing oxides/nitrides 34 formed from the process. The crown 30 and shelf 36 can spawn a potential discrete particle 38 capable of forming a dirty white spot 44. In certain conditions portions 37 of the electrode 14 can break away and fall into the melt pool 28 as well, potentially forming dendritic white spots. The fall-in particle 38 that falls into the melt pool 28 and does not completely remelt has the potential to create the dirty white spot 44. If the crown 30 and/or shelf 36 grows to a predetermined size, it may not be capable of remelting. Fall-in particles 38 that break away from the crown 30 and/or shelf 36 can fall into the melt pool 28 and do not completely remelt and fall down and settle into a mushy zone 40. The particles 38 can become engulfed into a solidification front 42. These particles 38 can form the dirty white spots 44.

A vibration source 46 can be coupled to the apparatus 10 and configured to break up the materials of the crown 30 and shelf 36 during the operation of the vacuum arc remelt process. The vibration source 46 can be coupled proximate the exterior 25 of the wall 24. The vibration source 46 controls the nucleation and growth mechanics of formation of the crown 30 and shelf 36. The vibration source 46 can decrease grain size, alter solidification rate, and significantly affect crystal structure and nucleation and growth behavior. The vibration source 46 can be configured to drive down the size of the crown 30 and shelf 36 to a minimal size. Thus, reducing the chance of fall-in particles 38 reaching the mushy zone 40 prior to remelting. The vibration source 46 can excite the resonance to promote rapid fatigue, fracture, and subsequent fall-in of the particle 38 before the particle 38 can reach a critical size that can precipitate the dirty white spot 44. The vibration source 46 can be mobile and move along the crucible 12 to optimize the influence on the crown 30 and shelf 36. Multiple vibration sources 46 are also contemplated and can be configured along the crucible 12 to control the crown 30 and shelf 36 formation.

In an exemplary embodiment, the vibration source 46 can be an ultrasonic transducer 48. The ultrasonic transducer 48 can be configured to emit ultrasonic waves 50. The ultrasonic transducer 48 can be focused to ultrasonically load the crown 30 and shelf 36. The oxide particles 34 can become brittle within the crown 30 and shelf 36 and serve as initiation points for fatigue cracks. The ultrasonic transducer 48 can also excite portions of the melt pool 28 and lead to the reduction of grain sizes in the ingot 16 and slow down the solidification process.

In an exemplary embodiment, an array of ultrasonic transducers 48 can be employed. The transducers 48 can be configured to emit the ultrasonic waves 50 at an optimum location around the crown 30 and shelf 36.

In an alternative embodiment, the vibration source 46 can include a mechanical vibrator 52. The vibrator 52 can generate mechanical vibration that transmits to the crown 30 and shelf 36 and breaks the crown 30 and shelf 36 down prior to buildup. The mechanical vibrator 52 can be configured to produce mechanical vibration in a range having a frequency of from 50 Hz to 200 Hz; and a force of up to 3500 pounds of centrifugal force.

The applied vibration parameters (amplitude, frequency, location, direction) will be tailored to reduce crown 30 and shelf 36 formation and mitigate fall-in particle 38 frequency. Multiple mechanisms contribute to crown 30 and shelf 36 formation including vapor deposits 20 and splatter beads 26 on the inside surface 22 of the crucible wall 24 as well as growth of the crown 30 and shelf 36 above the liquid line due to contact of the liquid 28 with the crucible wall and elevated cooling rate in this location. Exciting a range of frequencies from sonic (20 Hz-20 kHz) to ultrasonic (>20 kHz) will ensure that each of these mechanisms is addressed with a suitable vibratory signature. For example, solidifying material adhering to the crucible wall could be released using sonic energy while the resonance excitation of the small crown 30 would require ultrasonic vibration. Specifically, based on the typical size of fall-in particles 38 originating from the crown 30 and their mechanical properties, an ultrasonic frequency range of 50 kHz-400 kHz would excite the first natural frequency of the crown 30. This will in turn promote rapid fatigue, fracture, and subsequent fall-in of the particle 38 before it reaches a size that will not remelt. The vibration source 46 can be utilized to minimize the likelihood of dirty white spot formation due to fall-in particles 38 during the vacuum arc remelt process can be determined employing a microscale model 54.

The microscale model 54 coupled with a VAR model 56, 54) will be used to provide valuable insight into the process, including the critical fall-in particle 38 size for full remelting.

The microscale model 54 can be configured as a physics-based model capable of resolving the microstructure of the fall-in particles 38 including its grain structure and oxide/nitride stringers (micron scale resolution) and can be employed to inform/tune the VAR process parameters and sonic/ultrasonic method operating conditions (amplitude, frequency). The model 54 can be executed prior to running the VAR process in order to optimize the parameters to minimize crown 30 and shelf 36 formation and fall-in particle 38 frequency. Models are currently used to aid in choosing VAR process parameters however these models lack the resolution to simulate the details associated with the crown 30 and shelf 36 and fall-in particles 38 (microstructural details) that must be considered to optimize the process under conditions of crown 30 and shelf 36 formation, fracture, and creation of fall-in particles 38. These details include the interaction of the fall-in particle 38 with the temperature and velocity field in the melt pool 28 as well as the effect of the sonic/ultrasonic vibration on the solidifying material.

Using the microscale model 54, the ideal ultrasonic frequencies for solidification can also be determined. Key parameters such as ultrasonic wave type, orientation, and frequency can be considered in the model and the output used to inform the VAR process. The models can be used to evaluate whether it is possible to fully melt the particle 38 before it reaches the mushy zone 40 and provide guidance to the necessary ultrasonic field intensity to control solidification. The ultrasonic transducer can be configured to break up the materials of the crown 30 and shelf 36 during the operation of the vacuum arc remelt apparatus 10 responsive to a predetermined size of the crown 30 and shelf 36. The models can be utilized to determine the predetermined size of the crown 30 and shelf 36, depending on the variables related to the VAR and materials being processed.

An advantage of the vacuum arc remelt process include greater life and durability of parts due to the elimination of DWSs in the triple melt process which would lead to an equivalent cost reduction.

Another advantage comes with the reduction in DWSs, part designers can prescribe life based on less conservative estimates, making the overall manufacturing process less costly, less time consuming, and less energy intensive. Additionally, significant increase in safety will result.

There has been provided a vacuum arc remelt process. While the vacuum arc remelt process has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A vacuum arc remelt apparatus comprising:
   a crucible having a wall, said wall having an interior and an exterior opposite said interior;
   an electrode within the crucible proximate the interior;
   an ingot within the crucible and below the electrode, wherein said ingot includes a crown and a shelf;
   a vibration source at the exterior of the crucible, wherein said vibration source is structurally aligned adjacent to the crown and shelf configured to control nucleation and growth mechanics of formation of the crown and shelf.

2. The vacuum arc remelt apparatus according to claim 1, wherein said vibration source comprises at least one of an ultrasonic transducer and a vibrator.

3. The vacuum arc remelt apparatus according to claim 2, wherein said vibrator comprises a mechanical vibrator.

4. The vacuum arc remelt apparatus according to claim 2, wherein said ultrasonic transducer is structurally aligned adjacent to the crown and shelf to break up the materials of the crown and shelf during the operation of the vacuum arc remelt apparatus responsive to a predetermined size of the crown and shelf.

5. A vacuum arc remelt apparatus comprising:
   a crucible having a side wall, said side wall having an interior and an exterior opposite said interior, a bottom plate coupled to said side wall;
   an electrode coupled to a stinger, said stinger coupled to a ram configured to translate said electrode within said crucible;
   an ingot between said electrode and said bottom plate between said side wall proximate the interior, wherein said electrode forms a melt pool and a crown and a shelf responsive to an electrical arc with said ingot; and
   a mobile vibration source coupled to said exterior and configured to move along the crucible exterior to optimize the influence on the crown and shelf to control the nucleation and growth mechanics of formation of the crown and shelf.

6. The vacuum arc remelt apparatus according to claim 5, wherein said vibration source comprises an ultrasonic transducer.

7. The vacuum arc remelt apparatus according to claim 6, wherein said ultrasonic transducer is structurally aligned to direct ultrasonic energy to excite portions of the melt pool and lead to the reduction of grain sizes in the ingot.

8. The vacuum arc remelt apparatus according to claim 6, wherein said ultrasonic transducer is structurally aligned and focused to ultrasonically load the crown and shelf.

9. The vacuum arc remelt apparatus according to claim 1, wherein said vibration source comprises multiple vibration sources configured along the crucible to control the crown and shelf formation.

10. The vacuum arc remelt apparatus according to claim 5, wherein said vibration source comprises a vibrator.

11. A process for vacuum arc remelting comprising:
    inserting an ingot between an electrode and a bottom of a crucible of the vacuum arc remelt apparatus, said crucible comprising a wall having an interior and an exterior, said wall being adjacent said bottom;
    melting said electrode with an arc between said electrode and said ingot;
    forming a melt pool on top of said ingot proximate said electrode;
    vibrating a crown and shelf proximate said melt pool with a vibration source; said vibration source structurally aligned adjacent to the crown and shelf coupled to said crucible proximate said exterior; and
    breaking up the materials of the crown and shelf during the operation of the vacuum arc remelt apparatus with said vibration source.

12. The process of claim 11, wherein said vibration source comprises at least one of an ultrasonic transducer and a vibrator.

13. The process of claim 11, further comprising:
exciting portions of the melt pool with said vibration source to reduce grain sizes in the ingot.

14. The process of claim 11, further comprising:
focusing the vibration source to ultrasonically load the crown and shelf.

\* \* \* \* \*